Nov. 2, 1937.  A. W. ARNOLD  2,097,612

GREASE GUN

Filed July 27, 1935

To the part to be lubricated

From pump

Inventor
Albert W. Arnold
By Vernon E. Hodges
his Attorney

Patented Nov. 2, 1937

2,097,612

UNITED STATES PATENT OFFICE 2,097,612

GREASE GUN

Albert W. Arnold, Miami, Fla.

Application July 27, 1935, Serial No. 33,589

7 Claims. (Cl. 221—47.3)

My invention relates to an improved system or method of and mechanism for lubrication.

The usual equipment for the various types of lubrication requires in the neighborhood of six grease guns, with all its attendant expense.

The purpose of my invention is to provide a series of receptacles each of which is charged with a separate lubricant, so that a detachably connected pump or gun may be applied to the receptacle containing the desired lubricant, when the lubricant is to be forced therefrom, thus making a single gun serve the purpose of perhaps five or six separate guns as has hitherto been customary.

In the accompanying drawing.

Figure 1:
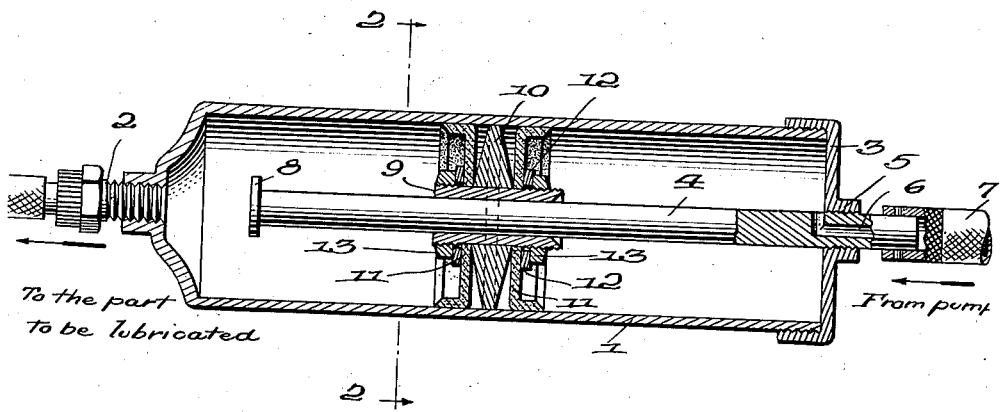
Fig. 1 is a longitudinal section.
Figure 2:
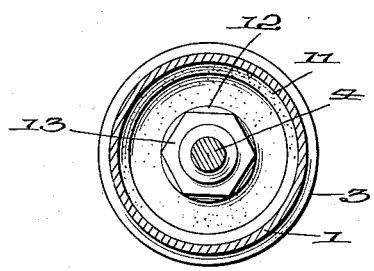
Fig. 2 is a transverse section on the line 2—2, of Fig. 1, looking in the direction of the arrows.

The numeral 1, represents the receptacle. This receptacle has a discharge nozzle 2 at one end, and a cap 3 removably secured, as for instance, screwed to the filling end.

A rod 4 is screwed into a threaded orifice 5 in the center of the cap 3.

Through the axial center of the rod 4, an inlet duct 6 is formed, and a hose 7 from the pump or gun is adapted to be detachably coupled to the outer end of this rod.

A piston is fitted to the wall of the receptacle and is not only slidably mounted in the receptacle but it is also slidably mounted on the centrally located rod 4, and the head 8 on the inner end of the rod forms a stop for the piston when it is moved to discharge the lubricant.

The piston may be variously constructed, but as illustrated, includes a sleeve 9, having threaded ends, and a disk 10 preferably having conical faces, mounted on the sleeve, and packing cups 11 opening in opposite directions and backed against the disk 10, where they are held by washers 12 and nuts 13, screwed on the threaded ends of the sleeve 9.

To fill the receptacle with lubricant, the cap 3 is removed, that is to say unscrewed, and the rod 4 is pulled out; the head 8 coming in contact with the piston, causes the piston to move with the rod and to be removed from the receptacle.

The receptacle is then filled with the selected lubricant, the piston is then reinserted in the open end of the receptacle, and after sliding the rod 4 through the piston, the cap 3 is screwed on the end of the receptacle. The receptacle is now loaded with lubricant and ready for use. When the particular lubricant contained in the receptacle, for example, chassis lubricant or any other lubricant for that matter, is required, the gun or pump is attached to the receptacle, containing that particular lubricant. Then oil or other fluid is forced from the pump or gun, through the hose 7, and the duct 6, into the receptacle under pressure of perhaps three thousand or more pounds to the square inch, into the space between the piston and the cap 3, thereby moving the piston forward through the receptacle, thus creating a forced feed pressure against the thick lubricant contained in the receptacle, causing it to discharge through the nozzle 2, and to be delivered to the part to be lubricated.

To refill or recharge the receptacle after the supply of lubricant shall have been exhausted, the cap 3 is removed, the rod 4 is withdrawn bringing with it the piston, the receptacle is recharged with lubricant, the piston is reinserted back of the lubricant, the rod is pushed through the piston, and the cap is secured on the open end of the receptacle. The receptacle is now charged and ready for further use.

I claim:

1. A lubricating device comprising a cylinder, and a piston operatively mounted therein, said piston including a disk having opposite conical faces and packing cups on opposite sides of the disk and turned in opposite directions.

2. A lubricating device comprising a cylinder, and a piston operatively mounted therein, said piston including a sleeve, a disk mounted thereon and having opposite conical faces, and packing cups on opposite sides of the sleeve in front of the conical faces and turned in opposite directions.

3. A lubricating device comprising a cylinder, and a piston operatively mounted therein, said piston including a sleeve, a disk mounted thereon and having opposite conical faces, packing cups on opposite sides of the sleeve in front of the conical faces and turned in opposite directions, and a rod fixed to one end of the cylinder and extending therein and slidably receiving the sleeve of the piston.

4. A lubricating device comprising a cylinder, and a piston operatively mounted therein, said piston including a disk having opposite conical faces, and packing cups secured on opposite sides of the disk in front of said faces.

5. A lubricating device comprising a cylinder, a piston operatively mounted therein and including a single disk having opposite conical faces, and packing cups secured at their inner edges on opposite sides of the disk in front of said faces and turned in opposite directions, said piston being adapted at one side to force a lubricant from one end of the cylinder, and means for admitting a fluid under pressure to the cylinder at the opposite side of the piston.

6. A lubricating device comprising a cylinder having a guide rod fixed therein, a piston slidably mounted on the guide rod and including a single disk having opposite conical faces with packing cups secured at their inner edges on opposite sides of the disk in front of said faces and turned in opposite directions, said piston being adapted at one side to force a lubricant from one end of the cylinder, and means for admitting a fluid under pressure to the cylinder at the opposite side of the piston.

7. A lubricating device comprising a cylinder, a guide rod having one end fixed in one end of the cylinder and extending lengthwise therein with an abutment on the opposite end of said rod, said rod having a duct in the fixed end opening into the cylinder for supplying fluid under pressure thereto, a piston slidably mounted on the guide rod and including a single disk having opposite conical faces with packing cups secured at their inner edges on opposite sides of the disk in front of and having the major portions thereof normally spaced from said faces, said cups being turned in opposite directions and being respectively pressed against said faces upon the application of pressure.

ALBERT W. ARNOLD.